United States Patent [19]

Tufts

[11] Patent Number: 4,999,799
[45] Date of Patent: Mar. 12, 1991

[54] SIGNAL PROCESSING APPARATUS FOR GENERATING A FOURIER TRANSFORM

[75] Inventor: Donald W. Tufts, East Greenwich, R.I.

[73] Assignee: Board of Governors for Higher Education, State of Rhode Island and Providence Plantations, Providence, R.I.

[21] Appl. No.: 295,122

[22] Filed: Jan. 9, 1989

[51] Int. Cl.$^5$ .......................................... G06F 15/332
[52] U.S. Cl. .................................................. 364/726
[58] Field of Search ................................. 364/726, 827

[56] References Cited

U.S. PATENT DOCUMENTS

| | | | |
|---|---|---|---|
| 4,159,528 | 6/1979 | Perry | 364/726 |
| 4,231,103 | 10/1980 | Timm | 364/726 |
| 4,823,295 | 4/1989 | Mader | 364/726 |

OTHER PUBLICATIONS

Bruun, "Z-Transform DFT Filters and FFT's", *IEEE Trans. on Acoustics, Speech, and Signal Processing*, vol. ASSP-26, No. 1, Feb. 1978, pp. 56–63.

*Primary Examiner*—David H. Malzahn
*Attorney, Agent, or Firm*—Samuels, Gauthier & Stevens

[57] ABSTRACT

Apparatus for producing the Fourier coefficients of a time and/or space-varying input signal utilizes a bank of delay filters whose outputs are selectively connected to the inputs of a bank of accumulating circuit each of which produces one of the desired Fourier coefficients. Each of the delay filters produces an output signal which is the weighted average of one or more samples of the input signal, the samples being equally spaced in time over the period of the input signal. The accumulating circuits, equal in number to the number of harmonics in the desired Fourier series, each produce a weighted sum of the output(s) of selected delay filters which are interconnected with the accumulating circuits in accordance with the so-called Mobius function. The apparatus may employ either general purpose or special purpose digital or analog processing circuits, and is particularly suitable for implementation with VLSI fabrication techniques. Futher circuit simplification may be achieved by preprocessing the input signal into a delta modulated bipolar signal to reduce the number of internal data paths and to permit the signal averaging function to be implemented with a simple up-down counter.

8 Claims, 3 Drawing Sheets

SIGNAL PROCESSING APPARATUS FOR GENERATING A FOURIER TRANSFORM

BACKGROUND OF THE INVENTION

This invention relates to high speed signal processing circuits and more particularly to special purpose VLSI coprocessing circuits for performing Fourier analysis and synthesis.

Spectacular advances have been made in recent years in the development of general purpose signal processing VLSI chips based on a microprocessor type of architecture. Though the development has been very rapid, the next generation of signal processing chips will require some innovative changes. One such change is the use of special-purpose coprocessors for basic operations such as narrow band filtering and Fourier analysis.

When performing real time signal processing, the continuous flow of data together with the complexity of the computations that have to be performed make it difficult to design a general purpose system which will perform a specific task efficiently. On the other hand, if an efficient algorithm for a specific task is found, there must be a suitable match between algorithm and VLSI layout if the solution is suitable for realization in hardware.

It is accordingly a principal object of the invention to efficiently and accurately perform a large class of signal processing tasks (including Fourier analysis, narrow-band filtering, and beamforming) by means of very large scale integration (VLSI) devices.

SUMMARY OF THE INVENTION

The present invention implements a novel algorithm for accurate high-speed Fourier analysis and synthesis. The necessary computations proceed in parallel and the individual operations are very simple. Except for a small number of scalings in one stage of the computation, only multiplications by 0, +1, and −1 are required. If the input samples were not quantized and if ideal real-number operations were used internally, then the results would be exact. The accuracy of the computation is limited only by the input A/D conversion process, any constraints on the word lengths of internal accumulating registers, and the implementation of the few scaling operations.

In accordance with a feature of the invention, the Fourier coefficients of a time-varying input signal are derived by the combination of a bank of delay filters whose outputs are selectively connected to the inputs of a bank of accumulating circuits each of which produces one of the desired Fourier coefficients. Each of the delay filters produces an output signal which is the weighted average of one or more samples of the input signal, the samples being equally spaced in time over the period of the input signal. The accumulating circuits, equal in number to the number of harmonics in the desired Fourier series, each produce a weighted sum of the output(s) of selected delay filters.

More specifically, to obtain the coefficients of a Fourier series of N harmonics, the coprocessor contemplated by the present invention would comprise a bank of N delay filters and a bank of N accumulators. Each of the delay filters, individually designated by a number n from 1 to N respectively, produces an output signal $S(n,t)$ which is the average of n samples, equally spaced in time, of the input signal $A(t)$. Each filter samples the input signal within an analysis interval which, in the case of a periodic input signal, may be the period of the lowest frequency component of the input signal. Expressed mathematically, the output $S(n,t)$ of a given delay filter n at time t is given by the relation:

$$S(n,t) = \frac{1}{n} \sum_{m=0}^{n-1} A(t - m/n)$$

In order to enhance the efficient, effective, high-speed realization of the algorithm in an integrated circuit, further simplicities are realized by the use of delta modulation to represent the input function in digital form. The result is that only binary (or preferably, ternary) sequences need to be processed in the parallel computation, and the required accumulations can be performed by up/down counters. The dynamic range of the resulting transformation can be increased by the use of adaptive delta modulation (ADM).

BRIEF DESCRIPTION OF THE DRAWINGS

In the description which follows, reference will frequently be made to the attached drawings which are briefly described below.

DETAILED DESCRIPTION

Figure 1:
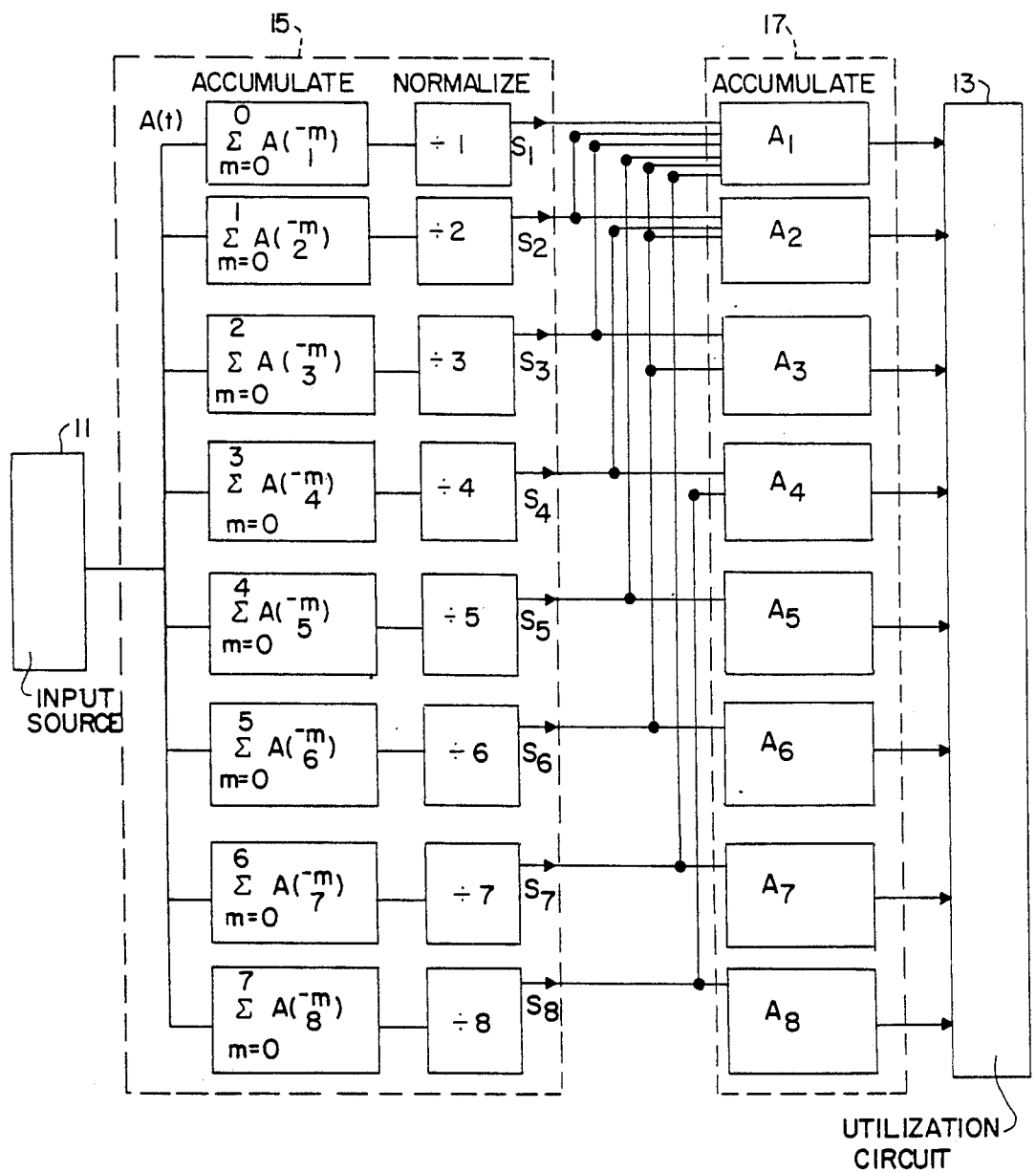
FIG. 1 graphically depicts the signal processing components which perform the conversion of a time-varying input signal into a set of output signals each representing one of the coefficients of the Fourier series which represents the input signal.

The basic organization of the signal processing circuit contemplated by the invention is illustrated in FIG. 1 of the drawings. The circuit processes an input signal from a source 11 into a set of output signals, each of which represents one of the coefficients of the Fourier series representation of the signal from source 11, the output signals being delivered to a utilization unit 13 as seen in FIG. 1. The signal processing circuit contemplated by the invention may be implemented by analog or digital devices and preferably takes the form a single VLSI circuit which may be employed to rapidly and accurately derive the Fourier coefficients which are utilized, in known ways, in a wide variety of applications, such as imaging systems, digital signal filters, and the like.

In accordance with the invention, a signal processing circuit capable of developing a desired number of coefficients comprises a bank of delay filters 15 and a bank of accumulators 17. Each of the delay filters in the bank 15 has an input connected to receive the input signal from source 11 and delivers, at its output, the average of a set of equally spaced samples of the time-varying input signal. In the embodiment seen in FIG. 1, the circuit delivers eight (8) Fourier series coefficients to the utilization unit 13. The uppermost filter in the bank 15 delivers a single sample taken (taken at time t=0) to its output. The next filter delivers the average of two samples (the first at time t=0 and the second at $t=-\frac{1}{2}$, where the period of the input waveform is assumed to be unity). The eighth and last filter at the bottom of bank 15 delivers the average of eight samples taken at t=0, $t=-\frac{1}{8}$, $t=-\frac{1}{4}$, $t=-\frac{3}{8}$, $t=-\frac{1}{2}$, $t=-\frac{5}{8}$, $t=-\frac{3}{4}$ and $t=-\frac{7}{8}$. As will be discussed later, the delay filters in the bank 15 may be simply implemented in a variety of ways using either analog or digital circuits, or a hybrid of analog and digital devices.

In accordance with the invention, the averaged sample signals produced by the delay filter bank 15 are summed in the bank of accumulators 17 each of which is connected to selected filters in the bank 15 in accordance with a pattern which is mathematically describable by the so-called "Mobius function," a known function which translates integers into the values +1, −1 and 0. The relationship of the Mobius function to the connection pattern depicted in FIG. 1 between the bank of delay filters 15 and the bank of accumulators 17 will be described and justified in more detail next.

THE MOBIUS FUNCTION

The Mobius function $\mu(n)$ of the positive integer n is defined by the formulas $$\mu(1) = 1 \tag{1}$$

$$\mu(n) = (-1)^s \text{ if } n = (p_1)(p_2)\ldots(p_s) \tag{1b}$$

where the $p_i$ are distinct primes $$\mu(n) = 0 \text{ if } p^2 | n \text{ for any prime } p \tag{1c}$$

The vertical bar notation m|n in (1c) and in other formulas below means that the integer m divides the integer n exactly with no remainder.

The function $\mu(n)$ is called the Mobius function after A. F. Mobius (1790–1868). Importantly, the only possible values of $\mu(n)$ are +1, −1, and 0. Properties of the Mobius function are presented in books on number theory. One useful source is the book entitled "Number Theory in Science and Communication", by Manfred R. Schroeder, Springer-Verlag, Berlin, 1986.

778 The Kronecker delta function may be represented using the Mobius function. The Kronecker delta function is defined for positive integers m and n by the formula $$\delta(m,n) = 1 \text{ for } n = m \tag{2}$$

$$\text{otherwise, } \delta(m,n) = 0 \tag{3}$$

The summary function of the Mobius function and its representation of the Kronecker delta function are expressed by the formula $$\delta(m,n) = \Sigma\mu(d) = \{1 \text{ if } (m/n) = 1, 0 \text{ otherwise}\} d|(m,n) \tag{4}$$

The values of m and n are positive integers and the summation is carried out over all positive integer values of d which exactly divide the positive integer m/n, including the values 1 and m/n. If m and n are chosen so that m/n is not an integer, there are no terms in the sum and its value is defined to be zero.

APPLICATION OF THE MOBIUS FUNCTION TO FOURIER ANALYSIS

The goal is the conversion of a real-valued periodic function A(t) into a Fourier series $$A(t) = \sum_{k=1}^{\infty} a_k(t) \tag{5}$$

in which $a_k(t) = A_k \cos(2\pi k t + 0_k)$ (6)

and $A_k$ and $0_k$ are the amplitude and the phase, respectively, of the $k^{th}$ harmonic term. As can be seen from formula (5) it will be assumed that A(t) has period one and contains no zero-frequency (constant) term. In addition, each harmonic term above the $N^{th}$ is assumed to be zero.

$$a_k(t) = 0 \text{ for } k = N+1, N+2, \ldots \tag{7}$$

The conversion circuit, as will be seen, employs a bank of delay-line (or transversal) filters each with input A(t). The output of the $n^{th}$ filter is denoted by S(n,t) and defined by the formulas $$S(n,t) = \frac{1}{n} \sum_{m=0}^{n-1} A(t - m/n) \tag{8a}$$

and $S(n,t) = 0$ for $n = +1, +2, \ldots$ (8b)

Note that S(a,t) = A(t). By replacing the variable t in formula (8) by (t+1/n) and using the periodicity of A(t), it can be seen the S(n,t) is periodic with period 1/n for n=1, 2, ..., . Further, by calculating the frequency response of the linear filtering operation of formula (8), the Fourier series of S(n,t) may be written as $$S(n,t) = \sum_{m=1}^{\infty} a_{mn}(t) \text{ for } n = 1, 2, \ldots, \tag{9a}$$

$$= \sum_{\substack{k \text{ such that} \\ n|k \text{ and } k<=n}} a_k(t) \tag{9b}$$

Because of the assumption of formula (7), only the first [N/n] terms of (9) can be non-zero. [N/n] denotes the largest integer which is less than or equal to N/n.

The main preliminary result, formula (9), about the harmonic content of the output of the $n^{th}$ filter can be restated as $$S(n,t) = \sum_{m=1}^{\infty} a_{mn}(t) \tag{10}$$

The following inverse formula may now be proven.

$$a_k(t) = \sum_{m=1}^{\infty} \mu(m) S(mk,t) \text{ for } k = 1, 2, \ldots, \tag{11}$$

Recall that, because of (8b), the summation in (11) contains at most n terms. The function $\mu(m)$ is the Mobius function which only takes on values +1, −1, and 0. Hence, formula (11) provides a very simple way of calculating the $k^{th}$ Fourier harmonic component from the simply computed filter outputs of formula (8a).

Formula (11) may be proven by the following steps: (a) substitute formula (10) into the right-hand side of the formula (11); (b) rearrange the order of summation; and (c) use the Kronecker-delta-function property of the summatory Mobius function (formula (4) above). Step (a) yields:

$$\sum_{m=1}^{\infty} \mu(m) S(mk,t) = \sum_{m=1}^{\infty} \mu(m) \sum_{n=1}^{\infty} a_{kmn}(t) \quad (12)$$

The remainder of the proof is carried out by rearranging the order of summation of the finite number of non-zero terms on the right side of (12) and using the special index-selection property of the summed values of the Mobius function which is specified by formula (4) above.

Rearranging the order of summation on the right hand side of (12) provides the following results:

$$\sum_{m=1}^{\infty} \mu(m) \sum_{n=1}^{\infty} a_{kmn}(t) = \sum_{m=1}^{\infty} \sum_{n=1}^{\infty} \mu(m) a_{kmn}(t) \quad (13a)$$

$$= \sum_{j=1}^{\infty} a_j(t) \left( \sum_{m|j/k} \mu(m) \right) \quad (13b)$$

$$= a_k(t) \quad (13c)$$

In forming (13b) from (13a) the terms are taken from (13a) which have a(j) as a factor and then added for j=1, 2, . . . . Because some values of j can be expressed in different ways as the product of three integers, j=kmn, the values of $\mu$ in (13a) for which the index m divides j/k are used; that is, j/k=mn because j =kmn by definition. finally, formula (4) is used to obtain (13c). That is, $$\sum_{m|j/k} \mu(m) = \{1 \text{ if } j/k = 1, 0 \text{ otherwise}\}) \quad (14)$$

Computing Fourier Coefficients using the Aft

The equations of the previous section may be explicitly written out to illustrate the computation of Fourier coefficients using the Arithmetic Fourier Transform for a signal band limited to eight harmonics. It will be assumed, without affecting the validity of the proof of the previous section, that A(t) is complex-valued.

$$A(t) = \sum_{k=1}^{8} A_k \exp(i2\pi kt) \quad (15)$$

The set of complex valued non-zero Fourier coefficients $\{A_k\}$ for k=1, 2, ... 8, can be calculated by evaluating formula (11) at t=0. The flow chart for the computations is shown in FIG. 1. For eight channels the values of A(t) at 22 instants, corresponding to the various values of m/n, are required.

It is instructive to compare this with the Fast Fourier Transform (FFT) algorithm. In the FFT computation only eight samples of the signal equally spaced in time are required. However, for VLSI realization the fact that multiply operations are involved in the FFT algorithm makes the implementation difficult. The algorithm based on the Mobius inversion which is contemplated by the present invention, having a simpler flow diagram, presents an easier task for VLSI layout.

VLSI Implementations

High speed signal processing circuits which embody the principles of the present invention may employ digital, analog or possibly mixed digital-analog techniques. Conventional sequential and parallel digital processing techniques, including those used in conventional, general purpose processors, may be employed as will be apparent to those skilled in the art, and the use of the arithmetic Fourier transform methods described here can significantly reduce the computational burden imposed. However, as has been noted, the methods contemplated by the present invention can be applied to particular advantage in the construction of special purpose VLSI processing circuits which are specially adapted to perform Fourier analysis and synthesis.

In order to obtain more insight into the trade-offs involved in a combined digital-analog realization, the use of analog sampled data techniques for the implementation of the algorithm will be discussed in more detail below.

Considerations for a Mixed Analog/Digital Implementation

Signal processing in accordance with the invention involves two types of arithmetic operations; averaging over different groups of equidistant samples and weighted summing with the Mobius coefficients as weight factors. Hence, when the process is performed continuously, it operates as a linear filter bank with outputs separating the harmonics.

First, consider an implementation where the delay-line filter outputs S(n,t) are continuously updated. To reduce the implementation costs for these filters, we can apply the following mathematical identity:

$$\frac{1}{n} \sum_{i=0}^{n-1} z^{-i} = \frac{(1 - z^{-n})}{(1 - z^{-1})} \quad (16)$$

Apart from the scaling factor 1/, the right hand side of this equation involves only two substractions, whereas the sum on the left requires additions. Therefore, the recursive representation of the running sum, also referred to as recursive running sum (RRS), is an attractive alternative for the implementation of the averaging filters S(n,t).

When inspecting formula (16) we note that the denominator quotient of the RRS is identical with the denominator of a lossless discrete integrator, a common building block for switched-capacitor (SC) filters. Hence, the recursive approach seems also well suited for an implementation by analog sampled-data techniques.

Figure 2:
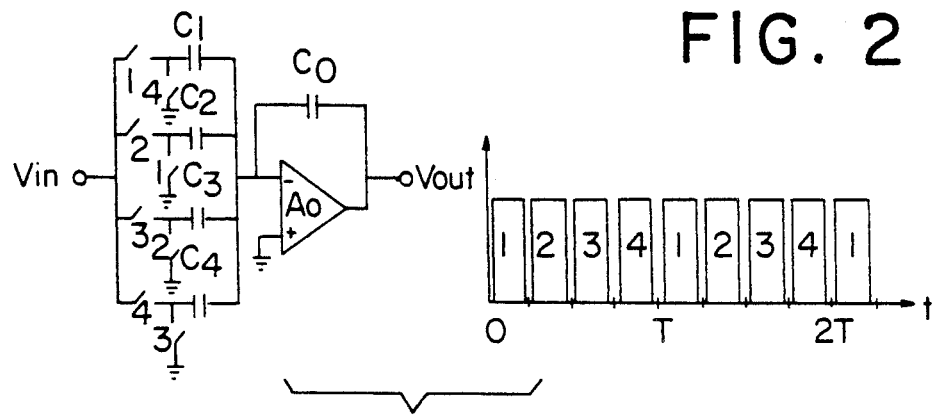
FIG. 2 depicts an analog, switched capacitor circuit which produces the recursive running sum of timed samples of an input signal, and which may be used to implement the delay filters employed in the invention.

FIG. 2 of the drawings shows a simple $3^{rd}$ order SC RRS filter together with the corresponding switching scheme of the type proposed in the paper "Switched-Capacitor FIR Filters," by G. Fisher, Proceedings of ISCAS, pp. 742-745, Philadelphia, May 1987. To understand the operation of this circuit, focus on one of the 4 input capacitors only, say $C_1$. During phase 1, this element is charged by the input voltage $V_{in1}$. Simultaneously, the law of charge perservation causes an identical, but negative charge to be built up in the feedback element $C_0$. This charge remains there until the following phase 4, when it is completely removed again from $C_0$ by discharging $C_1$. Hence, the initial condition is restored and the net charge transferred by $C_1$ over one full cycle is zero. If the initial sample and hold function (with a 25% duty cycle) is neglected, the z-domain transfer function realized by this single path can be written as:

$$H_1(z) = -(C_1/C_0)(1-z^{-1})/(1-z^{-1}) \quad (17)$$

The same sequence of charge redistributions is repeated with the other three input capacitors, the only difference being a shift of the sampling instant at the input by one, two or three quarters of a period, respectively.

The SC filter shown in FIG. 2 thus realizes an N-path system of the class described by L. E. Franks and I. W. Sandburg in "An Alternative Approach for the Realization of Network Transfer Functions: the N-Path Filter," Bell System Technical Journal, PP 1321–1350, Sept. 1960. Consequently, the discrete time domain variable z must be replaced by z (in our sample=4). For unity-gain at dc, the feedback capacitor of the $3^{rd}$ order filter must be 3 times larger than the 4 identical input elements (remember that we average over a sequence of 3 samples).

Since the recursive sum comprises a pole-zero cancellation at the origin, it is important to know how a nonideal amplifier affects this operation. If the finite amplifier open-loop gain $A_o$ is included in a first-order analysis, it can be shown that the finite gain does not affect the pole location. Instead it causes only a small gain error. The pole-zero balance at the origin is therefore not disturbed by the finite gain. This considerably reduces the requirements for the amplifier gain.

Another possible implementation of a continuously updated transversal filter is described by N. S. Reddy and M. S. Swamy in the paper "Switched-Capacitor Realization of FIR Filters," Proceedings of ISCAS, pp. 69–72, Montreal, May 1984. This solution is based on the earlier published concept described by A. Peled and B. Liu in "A new Approach for the Realization of Nonrecursive Digital Filters," IEEE Transactions on Audio and Electroacoustics, pp. 477–484, Dec. 1973, which suggests that the input signal may be delta modulated so that all subsequent operations may be carried out in a 1-bit binary system. So, even in case of an analog implementation, the delay line can be realized by a simple 1-bit binary shift register. The major drawback of this approach is the high sampling rate that is required in order to accurately represent the input signal by delta modulation techniques.

Figure 3:
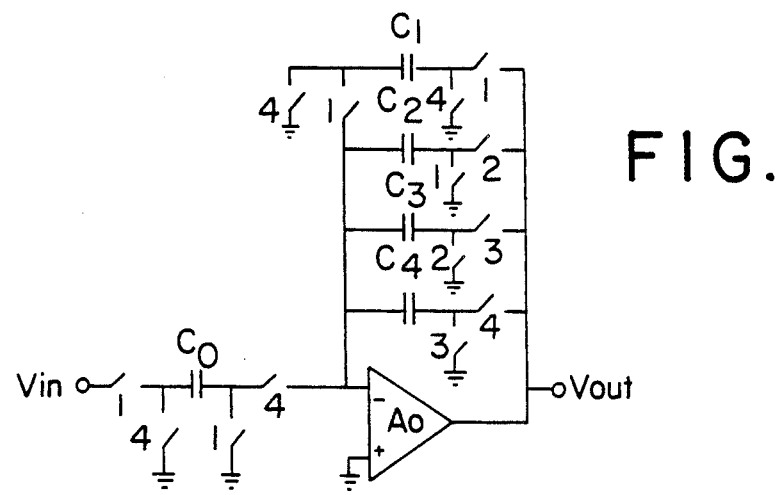
FIG. 3 is a schematic diagram of a 3-stage analog delay filter implemented as a lossless discrete integrator, which may alternatively be used to implement the invention.

The circuit of FIG. 3 represents an improvement over the most obvious solution for the realization of the averaging filter which would consist of a tapped delay line followed by a weighted summing stage. When using analog sampled data techniques, the adder can readily be implemented by a single, multiple input SC gain stage. The realization of an inexpensive analog delay line, however, is not a trivial problem. Typically, with a 2-phase nonoverlapping system clock, one unit-delay element requires one amplifier. In order to reduce the number of active elements, the circuit of FIG. 3 employs a poly-phase clocking scheme (>2 phases), where the amplifiers can be time multiplexed, resulting in a 3 stage SC delay line based on a 4-phase clocking scheme which compromises only one amplifier.

The circuit shown in FIG. 3 can readily be expanded to 4 or more delay stages by adding the corresponding number of feedback capacitors and providing an equal amount of extra clock phases. Generally, delay stages require +memory elements (i.e. feedback capacitors) and as many clock phases. The given stray-insensitive sampled data circuit is a modified version of the circulating-delay type SC integrator proposed in the paper "Narrow Band SC Bandpass Filters," IEEE Transactions on CAS, pp. 557–572, Aug. 1982, for the reduction of the clock feedthrough effect in SC-path filters. Since a delay line is transversal shift register, the original circuit has been modified such that the last memory element (i.e. the capacitor $C_1$) either transfers its charge to a subsequent identical delay line, or, as shown in FIG. 3, completely discharges itself during phase 4. An essential feature of the circuit of FIG. 3 is that the error due to capacitor mismatch is not cumulative since the signal transport is realized by shifting the same charge from one stage to the next, an operation that is independent of the actual capacitor values. The ratio error occurs only when the voltage across a capacitor is sensed, i.e., when the charge is transformed back to a voltage for further processing. In order to obtain a lossless charge transfer between the different states, the inverting input node of the amplifier must act as virtual ground. This typically requires an amplifier gain in the range of 80 dB.

Naturally, the advantage of requiring only one amplifier for delay stages must be paid for by a more complex phasing scheme and by higher requirements with regard to the amplifier settling behavior. Nevertheless, for a moderate number of delay-stages per amplifier (e.g. 3–7), the presented SC delay line may be advantageously used in analog signal processing implementations.

Figure 4:
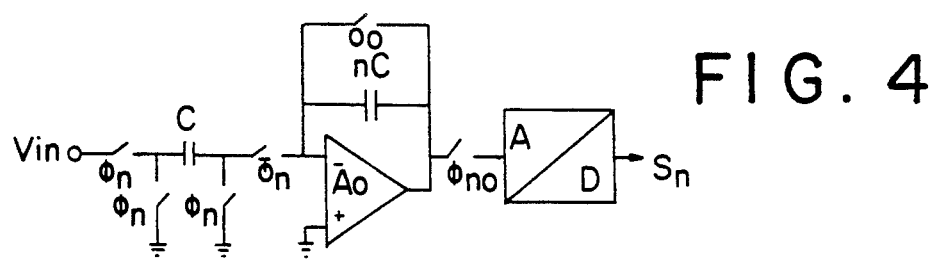
FIG. 4 illustrates still another implementation of the delay line filter which may be used to construct a signal processing circuit in accordance with the invention.

The circuit shown in FIG. 4 of the drawings represents a mixed analog/digital approach for the implementation of the simpler single event analysis, where only a single frame of windowed input function has to be analyzed. The basic building blocks required are a signal averaging stage followed by an adder which realizes the Mobius combining of the intermediate sums $S_n$. FIG. 4 shows how the initial data acquisition and the summation can be merged into a single SC gain stage. This circuit is essentially a discrete integrator which operates only during a specified time interval which corresponds to the length of the chosen time window. $\phi_n$ and its complement are nonoverlapping clock signals which sample the input signal at n times equi-distantly over the entire analysis period. $\phi_{n0}$ controls the data read-out and $\phi_0$ serves to reset the system. This solution considerably reduces the computations costs, since the only operation left after the A/D conversion is the Mobius combining of the intermediate sums $S_n$. Furthermore, by digitizing the data after the summation, the conversion rate is reduced considerably.

DELTA MODULATION

If the input data obtained from the source 11 seen in FIG. 1 takes the form of a sequence of multi-bit digital words, and all of the parallel channels used to process the individual coefficients also handle the data as multi-bit words, substantial circuit complexity is required.

Delta modulation may be employed to translate the time varying input function into a train of bipolar pulses, where a positive going (+1) pulse indicates an increase in baseband signal value (over the value at the immediately prior sampling time), and a negative going pulse (−1) indicates a decrease in that value. With a delta modulation signal (DMS) of this form, the delay filters of FIG. 1 which average the timed samples of DMS, may take the form of simple up-down counters which increment an accumulated count upon the receipt of each +1 pulse, and decrement the count upon the receipt of each −1 pulse. An adaptive delta modulation mechanism may be employed to enhance the dynamic range of the processing circuit. A review of delta modulation together with an extensive bibliography may be found in "Digital Coding of Waveforms, Principles and Applications" by N. S. Jayant and P. Noll, Prentice Hall, Inc. Englewood, NJ, 1984. The derivation of the delta modulated sequence for the scaled sum of n signals using the DMS of the individual signals as inputs to a simple logic network is described in "Operations on Delta Modulated Signals and their Application to the Realization of Digital Filters," The Radio and Electronic Engineer, Vol. 48, o. 9, pp. 431–438, Sept. 1978.

Figure 5:
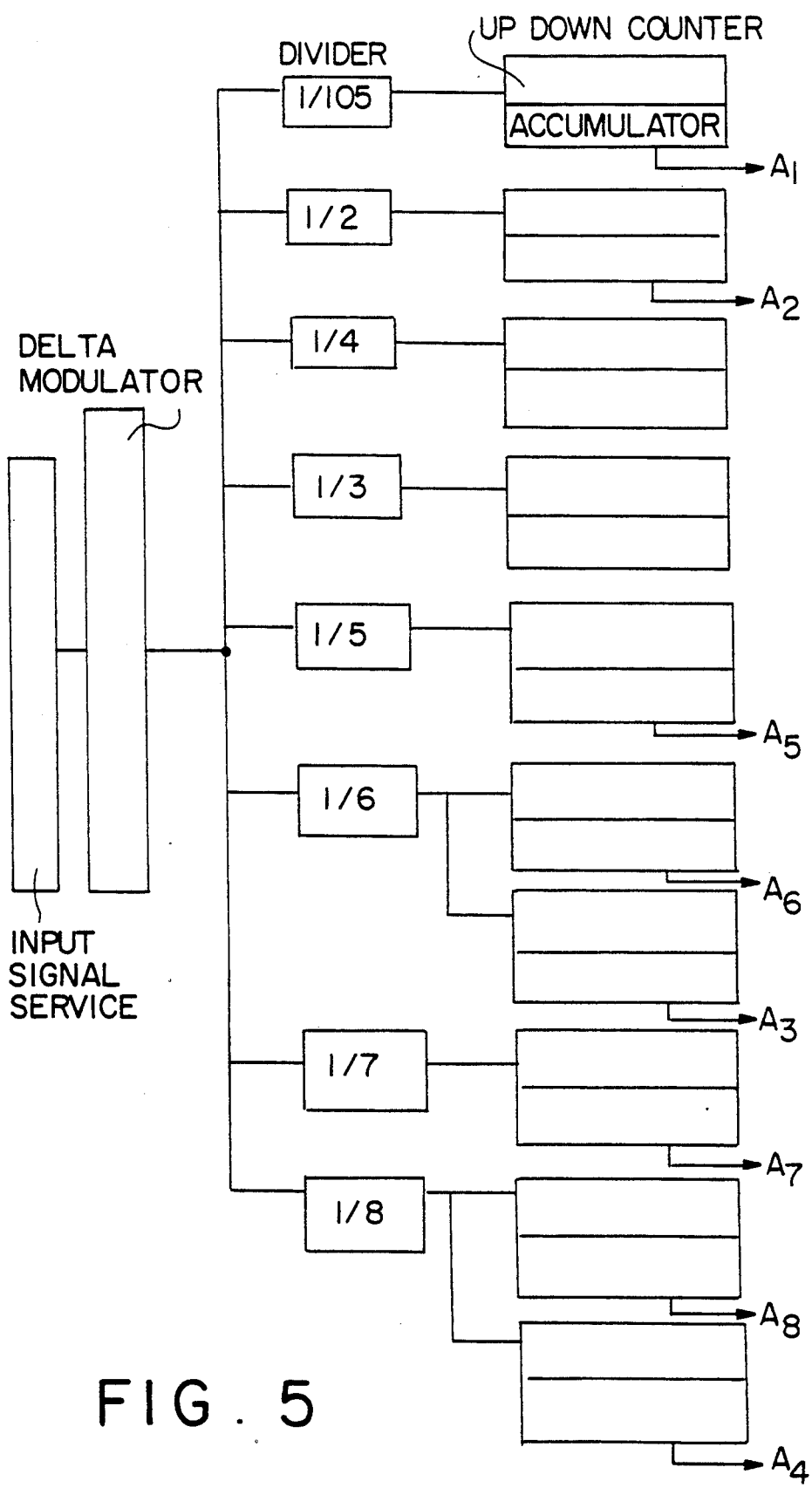
FIG. 5 is a schematic diagram of a simplified circuit realized by employing delta modulation to represent the input function.

FIG. 5 of the drawings illustrates a delta modulation scheme which utilizes the simplified up-down counter arrangement discussed above, and which also embodies a second reduction of hardware complexity by effectively moving the Mobious weighting function in front of the accumulation function. To understand how this may be done, note the nature of the signals accumulated in the bank of accumulators in FIG. 1. The accumulator A4, for example, receives average value signals based on samples taken at both ½ and ¼ period intervals. Since the ¼ period samples are merely a subset of the ½ period samples, a single ⅛ divider can be employed to supply both the A4 and A8 coefficient accumulations. Note that the first coefficient A1 accumulation must obtain samples at intervals of 1/7, 1/6 and 1/5 of the period (samples at ½ and ¼ being a subset of the samples at 1/6 of the period). Thus the A1 accumulator may be supplied with samples at intervals equal to 1/210 of the period (since 210 is an intergral multiple of 5, 6 and 7). The arrangement of FIG. 5 accordingly illustrates how the Mobius function can performed prior to the performance of the accumulation function, rather than in the order shown in FIG. 1 of the drawings.

It is to be understood that the embodiments of the invention which have been described are merely illustrative applications of the principle of the invention. Numerous modifications may be made to the arrangements described without departing from the true spirit and scope of the invention.

What is claimed is:

1. Signal processing apparatus for converting an input signal representing a function A(t) into a set of output signals respectively representing the values of coefficients of a Fourier series equivalent of said function A(t), said apparatus comprising, in combination, an input circuit for receiving said input signal, means for generating plural sets of samples of said input signal within an analysis period of independent variable t of said function A(t), means for generating an average value of each of said plural sets of said samples of said input signal, and means for generating said output signals by selectively accumulating selected ones of said average values, said average values being selected in accordance with the Mobius function.

2. Apparatus as set forth in claim 1 wherein said input circuit includes means for translating said input function into a delta modulation output signal.

3. Apparatus as set forth in claim 2 wherein said means for generating said output signals includes counting means responsive to said delta modulation signal for accumulating said average values.

4. Apparatus as set forth in claim 3 wherein said delta modulation signal is a ternary signal which assumes values indicating an increase, decrease, or no change in the level of said input signal and in which said counting means is an up-down counter for maintaining a count value which is incremented when said delta modulation signal indicates an increase and which is decremented when said delta modulation signal indicates a decrease.

5. Signal processing apparatus for converting an input signal representing a function A(t) into at least one output signal representing the value of a coefficient of a Fourier series equivalent of said function A(t), said apparatus comprising, in combination, an input circuit for receiving said input signal, means for generating plural sets of samples of said input signal within an analysis period of independent variable t of said function A(t), means for generating an average value of each of said plural sets of said samples of said input signal, and means for generating said value representing said coefficient by selectively accumulating said average value of selected ones of said sets of samples, said sets being selected in accordance with the Mobius function.

6. Apparatus as set forth in claim 5 wherein said input circuit includes means for translating said input function into a delta modulation output signal.

7. Apparatus as set forth in claim 6 wherein said means for generating said value representing said coefficient includes a counter responsive to said delta modulation signal for accumulating said average value.

8. Apparatus as set forth in claim 7 wherein said delta modulation signal is a ternary signal which assumes values indicating an increase, decrease, or no change in the level of said input signal and in which said counter is an up-down counter for maintaining a count value which is incremented when said delta modulation signal indicates an increase and which is decremented when said delta modulation signal indicates a decrease.

* * * * *

UNITED STATES PATENT AND TRADEMARK OFFICE
CERTIFICATE OF CORRECTION

PATENT NO. : 4,999,799
DATED : March 12, 1994
INVENTOR(S) : Donald W. Tufts

It is certified that error appears in the above-indentified patent and that said Letters Patent is hereby corrected as shown below:

Column 1, line, after the title and before the Background of the Invention, insert the following:

--This invention was made with government support under Contract Numbers DAAL 03 86 k 0108 and DAAL 03 90 g 0106, awarded by the United States Army Research Office. The government has certain rights in the invention.--.

Signed and Sealed this

Eleventh Day of October, 1994

Attest:

BRUCE LEHMAN

Attesting Officer

Commissioner of Patents and Trademarks